Figure 1:
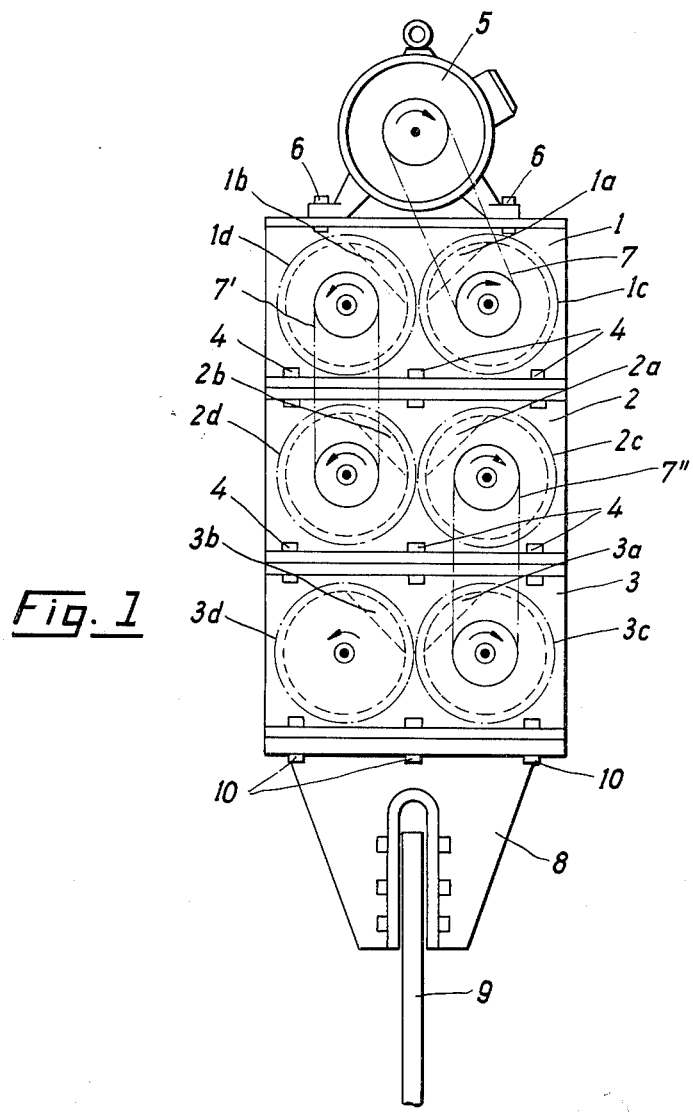

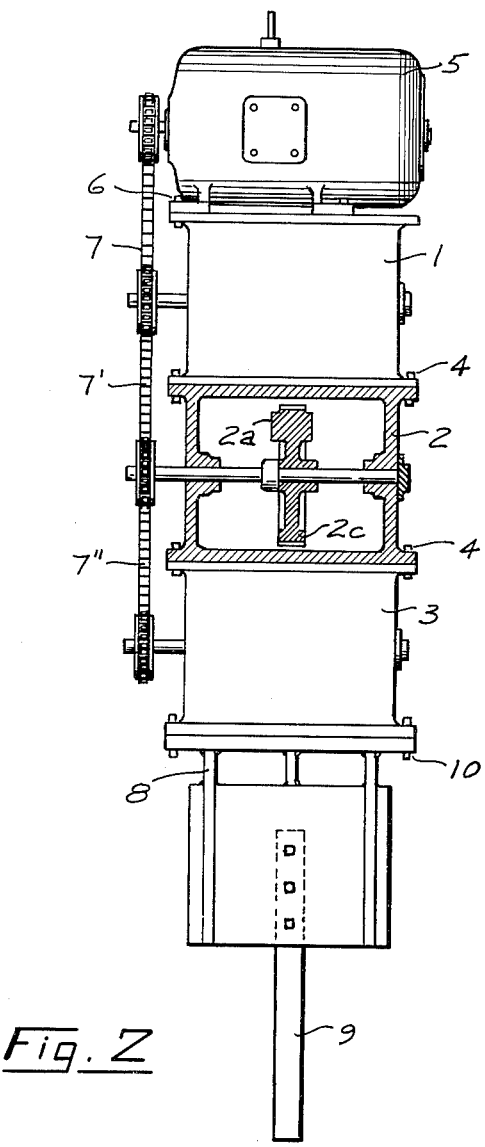

United States Patent Office 3,056,306
Patented Oct. 2, 1962

3,056,306
EXCITER ASSEMBLY FOR VIBRATORY DEVICES
Ludwig Müller, Heinrich-Heine Strasse 41,
Marburg an der Lahn, Germany
Filed Apr. 5, 1960, Ser. No. 20,205
Claims priority, application Germany Apr. 25, 1959
6 Claims. (Cl. 74—61)

The invention relates to an exciter assembly actuated by centrifugal force for a vibratory device, for instance for ramming or driving pile members, and more particularly to an exciter assembly in which masses synchronously rotating in opposite direction generate alternately directed or reciprocatory rectilinear forces.

There are known several exciter assemblies actuated by centrifugal force for use in connection with pile driving and similar machines. In machines as heretofore known the rotary masses of the exciter are disposed in a casing which is structurally combined with the vibratory machine proper. In arrangements of this kind an increase of the power output of the exciter itself is possible only within very narrow limits since the rotary masses which control the power output of the entire arrangement can be increased only slightly due to the limited space available within the casing.

It is the object of the invention to provide a novel and improved exciter assembly of the general kind above referred to, the power output of which can be changed within wide limits.

According to a more specific object of the invention, a novel and improved centrifugally actuated exciter assembly is provided in which several exciter units are disposed in series so that the vectors of force of all the units are oriented on the same line of action. The several exciter units are releasably secured to each other, and by adding or removing units any desired power output can be produced.

Still another object of the invention is to obtain a compact structure of the entire arrangement by superimposing the units and mounting the driving motor for the entire arrangement on the uppermost unit.

A still further object of the invention is to provide a novel and improved exciter assembly for drivingly coupling to the assembly a device operable by oscillatory forces, such as a device for driving or lifting pile members or an oscillatory machine operated by impulses of force.

Other and further objects, features and advantages of the invention will be pointed out hereinafter and set forth in the appended claims constituting part of the invention.

In the figures of the accompanying drawings, a preferred embodiment of the invention is shown by way of illustration and not by way of limitation.

In the drawings:

FIG. 1 shows an elevational front view of an exciter assembly according to the invention, and FIG. 2 is a side view, partly in section, of FIG. 1.

The assembly as shown comprises three vibratory units 1, 2 and 3 disposed in superimposition. The three units are releasably secured to each other by any suitable fastening means shown as nuts and bolts 4. Each unit comprises a pair of rotary masses 1a, 1b; 2a, 2b; and 3a, 3b. A drive motor 5 for the exciter assembly is mounted on the uppermost unit 1 by means of suitable fastening means such as screws and bolts 6. Motor 5 and all the rotary masses are drivingly coupled by transmission means.

The transmission means are shown as gears 1c, 1d; 2c, 2d; and 3c, 3d. These gears are mounted coaxially with the respective rotary masses and the two gears of each unit are in mesh with each other. Motor 5 is coupled with mass 1a by a flexible endless drive such as chain drive 7. Similarly, masses 1b, 2b and 2a, 3a are coupled by chain drives 7' and 7". The respective rotary directions are indicated by arrows and as will be noted, the two rotary masses of each unit rotate in opposite directions.

The vibratory force generated by the assembly during operation is utilized by a device shown as a clamping device 8. This device is suitably secured, for instance, by bolts and nuts 10 to the lowermost unit 3. A member 9 such as a pile member may be clamped to a device 8.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An exciter assembly actuated by a centrifugal force for use with a vibratory device, said exciter assembly comprising a plurality of self contained vibratory units including oppositely and synchronously rotary masses and drive means for rotating said masses, said vibratory units being disposed in linear alignment, and fastener means releasably securing said vibratory units to each other, said vibratory units coacting with each other to generate common rectilinear vectors of force.

2. An exciter assembly actuated by a centrifugal force for use with a vibratory device, said assembly comprising several self contained vibratory units each including oppositely and synchronously rotary masses, said vibratory units being disposed in linear alignment, fastener means releasably securing said vibratory units to each other, a common drive means for rotating said units, transmission means drivingly coupling said drive means with one of said units and said one unit with the other units, said vibratory units coacting with each other to generate common vectors of force oriented in the same direction.

3. An exciter assembly actuated by centrifugal force for use with a vibratory device, said exciter assembly comprising several vibratory units, each including oppositely and synchronously rotary masses, said vibratory units being disposed one above the other in linear alignment, fastening means releasably securing the vibratory units to each other, a common drive means for rotating said units, and transmission means drivingly coupling said vibratory units to each other and the drive means, said vibratory units coacting with each other to generate common vectors of force oriented in the same direction.

4. An exciter assembly according to claim 3 wherein said common drive means is mounted upon the uppermost vibratory unit.

5. An exciter assembly according to claim 3 wherein each of said vibratory units comprises a pair of oppositely rotary masses, the two masses in each unit being directly coupled and a rotary mass in each unit being drivingly coupled with a rotary mass in an adjacent unit one of the rotary masses in the uppermost unit being coupled with the drive means.

6. An exciter assembly according to claim 3 wherein said common drive means is mounted upon the uppermost unit, and wherein a mounting means depends from the lowermost unit for drivingly coupling the assembly to a vibrations utilizing device.

References Cited in the file of this patent

UNITED STATES PATENTS

| | | |
|---|---|---|
| 2,304,573 | Kessler | Dec. 8, 1942 |
| 2,593,467 | Maar | Apr. 22, 1952 |
| 2,722,407 | Bakker | Nov. 1, 1955 |
| 2,972,895 | Wilson | Feb. 28, 1961 |
| 2,975,846 | Bodine | Mar. 21, 1961 |